(12) United States Patent
Li

(10) Patent No.: US 12,524,478 B2
(45) Date of Patent: Jan. 13, 2026

(54) METHOD, APPARATUS, DEVICE AND STORAGE MEDIUM FOR CONTENT DISPLAY

(71) Applicant: Beijing Zitiao Network Technology Co., Ltd., Beijing (CN)

(72) Inventor: Zhaoying Li, Beijing (CN)

(73) Assignee: Beijing Zitiao Network Technology Co. , Ltd., Beijing (CN)

( * ) Notice: Subject to any disclaimer, the term of this patent is extended or adjusted under 35 U.S.C. 154(b) by 13 days.

(21) Appl. No.: 18/572,730

(22) PCT Filed: Sep. 29, 2022

(86) PCT No.: PCT/CN2022/122411
§ 371 (c)(1),
(2) Date: Dec. 20, 2023

(87) PCT Pub. No.: WO2023/061230
PCT Pub. Date: Apr. 20, 2023

(65) Prior Publication Data
US 2024/0289398 A1    Aug. 29, 2024

(30) Foreign Application Priority Data

Oct. 13, 2021 (CN) .......................... 202111192745.9

(51) Int. Cl.
*G06F 16/9535* (2019.01)
*G06F 16/9536* (2019.01)

(52) U.S. Cl.
CPC ...... *G06F 16/9535* (2019.01); *G06F 16/9536* (2019.01)

(58) Field of Classification Search
CPC .......................... G06F 16/9535; G06F 16/9536
(Continued)

(56) References Cited

U.S. PATENT DOCUMENTS 9,609,398 B2 *   3/2017   Itamoto ............ H04N 21/64322
10,684,738 B1 *   6/2020   Sicora .................. G06F 3/0485
(Continued)

FOREIGN PATENT DOCUMENTS

CN        108984081 A      12/2018
CN        109120981 A       1/2019
(Continued)

OTHER PUBLICATIONS

Shamma, David A., et al., "Spinning Online: A Case Study of Internet Broadcasting by DJs", C&T '09, Jun. 25-27, 2009, University Park, PA, pp. 175-184.*
(Continued)

*Primary Examiner* — Robert Stevens
(74) *Attorney, Agent, or Firm* — BakerHostetler

(57) ABSTRACT

The disclosure discloses a method, an apparatus, a device, and a storage medium for content display. The method includes: displaying, in a content stream display interface, a first content in a first content stream; and if a first predetermined content switching condition is satisfied, displaying, in the content stream display interface, at least one of a second content in a second content stream and information associated with the second content, wherein the second content has a predetermined association with an operation of a current user, and the content in the second content stream is posted by the first user.

20 Claims, 6 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 11,727,018 | B1 * | 8/2023 | Friggeri ................. | H04L 51/214 709/217 |
| 2009/0024923 | A1 | 1/2009 | Hartwig et al. | |
| 2009/0148124 | A1 * | 6/2009 | Athsani .............. | H04N 21/6582 386/241 |
| 2015/0033253 | A1 * | 1/2015 | Yoshioka ........... | H04N 21/4882 725/32 |
| 2015/0128168 | A1 * | 5/2015 | Itamoto ................. | H04H 60/37 725/32 |
| 2018/0035150 | A1 * | 2/2018 | Lewis ................... | G06F 16/904 |
| 2022/0021941 | A1 * | 1/2022 | Mitchard ............ | G06F 3/04883 |

FOREIGN PATENT DOCUMENTS

| | | | |
|---|---|---|---|
| CN | 109640129 A | 4/2019 | |
| CN | 110601956 A | 12/2019 | |
| CN | 110673774 A | 1/2020 | |
| CN | 110688571 A | 1/2020 | |
| CN | 110737846 A | 1/2020 | |
| CN | 110866183 A | 3/2020 | |
| CN | 110955819 A | 4/2020 | |
| CN | 111586466 A | 8/2020 | |
| CN | 111597435 A | 8/2020 | |
| CN | 111831917 A | 10/2020 | |
| CN | 111930459 A | 11/2020 | |
| CN | 109996102 B | 1/2021 | |
| CN | 112261226 A | 1/2021 | |
| CN | 113111286 A | 7/2021 | |
| CN | 113259740 A | 8/2021 | |
| CN | 113849258 A | 12/2021 | |
| CN | 115576456 A | 1/2023 | |
| WO | WO 2021/052085 A1 * | 3/2021 | ............. H04N 21/25 |
| WO | WO 2021/185017 A1 * | 9/2021 | ........... H04N 21/431 |

OTHER PUBLICATIONS

Roos, Dave, "How Video Sharing Works", HowStuffWorks, web archive, https://web.archive.org/web/20120123173743/https://computer.howstuffworks.com/internet/basics/video-sharing.htm, archived on Jan. 23, 2012, pp. 1-6.*

International Patent Application No. PCT/CN2022/122411; Int'l Search Report; dated Dec. 22, 2022; 2 pages.

Written Opinion for International Application No. PCT/CN2022/122411, mailed Dec. 22, 2022, 9 Pages.

* cited by examiner

METHOD, APPARATUS, DEVICE AND STORAGE MEDIUM FOR CONTENT DISPLAY

CROSS-REFERENCE

This application claims priority to the Chinese Patent Application No. 202111192745.9 filed to the Chinese Patent Office on Oct. 13, 2021, which is incorporated herein by reference in its entirety.

FIELD

The present disclosure relates to the field of computer technology, for example, to a method, an apparatus, a device and a storage medium for content display.

BACKGROUND

With the rapid development of Internet technology, a variety of applications emerge, providing users with increasingly rich interaction patterns and interactive experiences.

In some application platforms, users are allowed to post various forms of contents such as a text, an image, an audio, or a video for other users to view. In related technologies, many applications display a content to users in a form of a content stream, and users may switch between different contents in the content stream by inputting operations such as swiping up or down. However, content display manners are not flexible enough.

SUMMARY

Embodiments of the present disclosure provide a method, an apparatus, a storage medium and a device for content display, which may optimize existing content display schemes.

In a first aspect, the embodiments of the present disclosure provide a method of content display, and the method comprises:
  displaying, in a content stream display interface, a first content in a first content stream, wherein the first content is posted by a first user; and
  if a first predetermined content switching condition is satisfied, displaying, in the content stream display interface, at least one of a second content in a second content stream and information associated with the second content, wherein the second content has a predetermined association with an operation of a current user, and the content in the second content stream is posted by the first user.

In a second aspect, the embodiments of the present disclosure provide an apparatus for content display, and the apparatus comprises:
  a first displaying module configured to display, in a content stream display interface, a first content in a first content stream, wherein the first content is posted by a first user; and
  a second displaying module configured to, if a first predetermined content switching condition is satisfied, display, in the content stream display interface, at least one of a second content in a second content stream and information associated with the second content, wherein the second content has a predetermined association with an operation of a current user, and the content in the second content stream is posted by the first user.

In a third aspect, the embodiments of the present disclosure provide an electronic device. The electronic device comprises a memory, a processor, and a computer program stored on the memory and executable on the processor, and the processor, when executes the computer program, performs the method of content display according to the embodiments of the present disclosure.

In a fourth aspect, the embodiments of the present disclosure provide a computer-readable storage medium having a computer program stored thereon, and the computer program, when executed by a processor, performs the method of content display according to the embodiments of the present disclosure.

DETAILED DESCRIPTION

Figure 1:
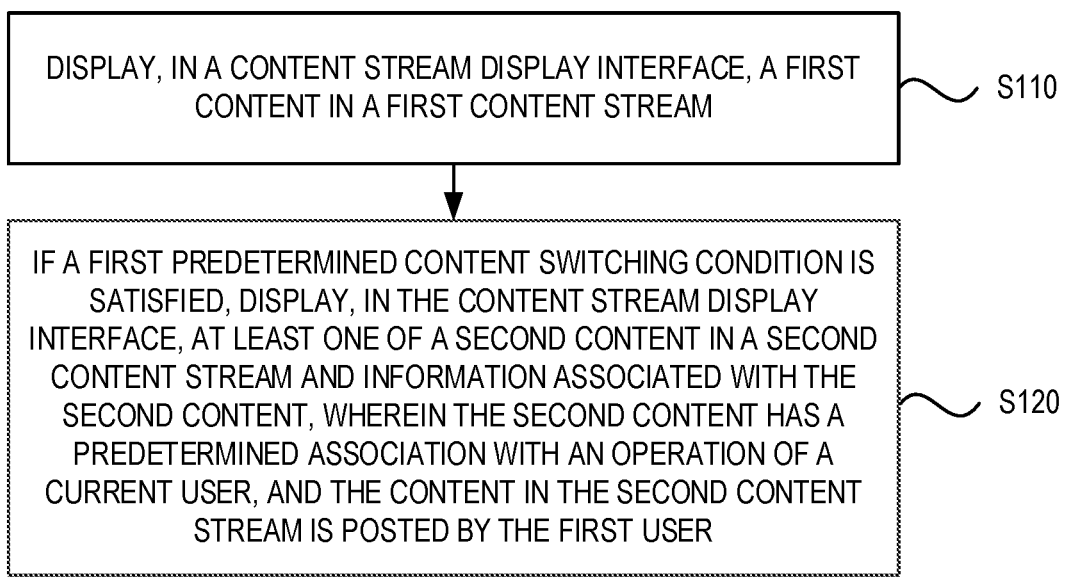
FIG. 1 is a schematic flow diagram of a method of content display provided by the embodiments of the present disclosure.

The following will describe the embodiments of the present disclosure with reference to the accompanying drawings. Although some embodiments of the present disclosure are shown in the drawings, the present disclosure can be implemented in various forms, and these embodiments are provided for understanding the present disclosure. The drawings and embodiments of the present disclosure are for illustrative purposes only.

The multiple steps described in the method implementation of the present disclosure may be executed in different orders and/or in parallel. In addition, the method implementation may include additional steps and/or omit a shown step.

The term "comprising" and its variations as used herein are open to comprise, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in the present disclosure are only used to distinguish different apparatuses, modules, or units, and are not used to limit the order or interdependence of the functions performed by these apparatuses, modules, or units.

The modifications of "one" and "multiple" mentioned in the present disclosure are illustrative and not restrictive.

Those skilled in the art should understand that unless otherwise indicated in the context, they should be understood as "one or more".

Messages or names of the messages exchanged between a plurality of apparatuses in the implementations of the present disclosure are for illustrative purposes only and are not intended to limit the scope of these messages or information.

The following embodiments, each embodiment simultaneously provides optional features and examples, the various features described in the embodiment may be combined to form a plurality of optional embodiment, each numbered embodiment should not be regarded as only one technical solution.

FIG. 1 is a schematic flow diagram of a method of content display provided by the embodiments of the present disclosure. The method may be performed by an apparatus for content display, and the apparatus may be implemented by software and/or hardware and may generally be integrated into an electronic device. The electronic device may be a mobile device such as a mobile phone, a smartwatch, a tablet computer, and a personal digital assistant; it may also be other devices such as a desktop computer. As shown in FIG. 1, the method comprises:

step 101: displaying, in a content stream display interface, a first content in a first content stream.

In one embodiment, the first content is posted by a first user, the first content stream includes a content posted by a second user, and the second user is different from the first user.

In the embodiments of the present disclosure, the content stream display interface may be a page in a predetermined application, and the predetermined application may provide a content stream display function, which may be installed in an electronic device. Users may register an account and log into the predetermined application. The content stream may include a text content, an image content, an audio content, and a video content, or the like, which may be displayed on the content stream display interface. Generally, a plurality of contents may be continuously displayed through a user operation. The actual display manner may be determined based on the content form, such as displaying the text content or playing the video content. Alternatively, the content in the content stream may be presented in a form of a work, such as a novel, a comic, a song, a video, or the like. Users may upload the work to be posted to a server end corresponding to the predetermined application, and the work may be issued by the server end to the predetermined application used by other users for displaying. Taking an actual application scenario as an example, the predetermined application includes a video application, and the content stream includes a video. The video application is used to play videos posted by users. Authors of the videos may upload their own video works to the video platform, and the video platform may issue the video works to the video application used by other users for playback. Other users may watch the video works posted by the author of the video on the content stream display page.

In the embodiments of the present disclosure, the first content stream may include contents posted by at least two users. The first user may be any one of the at least two users, and the first content may be any content posted by the first user, which may be determined according to a content recommendation algorithm or a content recommendation model actually used. The second user may be any one of the at least two users.

For example, one or more content flow display interfaces may be set in the predetermined application, and sources of the content displayed in different content flow display interfaces may be different. For example, for the video application, it may include a video recommendation page and a friend page. The content displayed in the video recommendation page may come from videos posted by any user in the predetermined application; the content displayed in the friend page may come from videos posted by users who have a friend relationship with the current user. The content flow display interface involved in the embodiments of the present disclosure may include one or more predetermined content flow display interfaces in the predetermined application.

Step 102: if a first predetermined content switching condition is satisfied, display, in the content stream display interface, at least one of a second content in a second content stream and information associated with the second content. The second content has a predetermined association with an operation of a current user, and the content in the second content stream is posted by the first user.

It should be noted that the current user may be different from the first user and the second user.

In related arts, only one content stream is usually displayed in a content stream display interface. The content in the same content stream usually uses a predetermined content recommendation algorithm or a predetermined content recommendation model to determine the display order. It may also be understood that one content stream corresponds to one content recommendation queue. For the first content stream mentioned above, the corresponding content recommendation queue generally contains contents posted by a plurality of users. There are usually a large number of contents posted by other users between the two contents posted by the same user, and even the two contents posted by the same user may not be displayed within a certain period of time (such as within 30 minutes). In this way, if the current user is interested in the content posted by the first user, the current user cannot continue to view the content posted by the first user that has not been viewed before in the current content stream display interface other than the first content. Generally, the current user needs to find a personal homepage entrance of the first user, enter the personal homepage of the first user, and select other contents to view in the work list in the personal homepage. The operation path is long, and the operation process is relatively cumbersome, resulting in low content viewing efficiency.

In the embodiments of the present disclosure, a second content stream is set, and the content of the second content stream is posted by the first user, that is, the second content stream may only include the content posted by the first user, and does not include the content posted by users other than the first user.

For example, the first predetermined content switching condition may be predetermined. While displaying the first content in the first content stream in the content stream display interface, whether the first predetermined content switching condition is satisfied may be decided. Based on the decided result that the first predetermined content switching condition is satisfied, at least one of the second content in the second content stream and the information associated with the second content may be displayed in the content stream display interface. The second content stream may include at least one second content, and the second content stream may also include at least one information associated with the second content. The first predetermined content switching condition may be set according to the operation situation of the predetermined application itself or according to the operation input by the current user in the predetermined application.

For example, the second content has a predetermined association with an operation of the current user. Alternatively, the second content has the predetermined association with the operation of the current user comprises: the second content is a content that the current user has not viewed, that is, the second content may be a content in the second content stream that has not been viewed by the current user; or, it may further be: the content in the second content stream is a content posted by the first user that the current user has not viewed. Alternatively, the second content has the predetermined association with the operation of the current user comprises: the second content is a content that the current user has collected or reserved, or the like. Because the second content has the predetermined association with the operation of the current user, different users as current users may view different second content streams, achieving more personalized content viewing.

For example, if the first predetermined content switching condition is satisfied, the second content in the second content stream may be displayed in the content stream display interface. For example, the second content may be displayed in the content stream display interface, and the display manner of the second content is consistent with that of the first content, thereby realizing display switching of contents in different content streams and improving the efficiency of content switching.

For example, if the first predetermined content switching condition is satisfied, information associated with the second content may be displayed in the content flow display interface. The information here may include text information (for example, a name or summary of the second content, or the like), identifier information (for example, an identifier or a symbol representing the second content, or the like), and image information (for example, a screenshot of the second content), or the like. By displaying information associated with the second content, the current user may easily understand relevant information of the second content and decide whether to view the corresponding second content. Alternatively, if the predetermined operation performing on the target information in the information associated with the second content is received, the second content associated with the target information is displayed in the content flow display interface.

In the content display scheme provided in the embodiments of the present disclosure, the first content in the first content stream is displayed in the content stream display interface, where the first content is posted by the first user. If the first predetermined content switching condition is satisfied, at least one of the second content in the second content stream and information associated with the second content is displayed in the content stream display interface, where the second content has the predetermined association with the operation of the current user, and the content in the second content stream is posted by the first user. By adopting the above technical solution, the content or the associated information in different content streams may be displayed more flexibly, the content display manner may be enriched, and the switching between different content streams may be performed more conveniently, reducing user operations, which is conducive to improving information delivery efficiency and content viewing efficiency. Moreover, the content in the second content stream has the predetermined association with the current user, so that personalized content viewing may be realized.

In some embodiments, the second content stream includes a content posted by the first user in a most recent predetermined historical period; or, the second content stream includes a predetermined number of contents recently posted by the first user. The advantage of this setting is that contents in the second content stream is pre-screened in the time dimension, and a relatively new content is displayed to the current user. While controlling the number of contents in the second content stream, it avoids an overly outdated content affecting the enthusiasm or interest of the current user to continue viewing the second content stream. The predetermined historical period may be set according to actual needs, such as one month or one week, etc.; the predetermined number may further be set according to actual needs, such as 5 or 10, or the like.

In some embodiments, a duration of the predetermined historical period is negatively correlated with a frequency of contents posted by the first user. The advantage of this setting is that it may be more flexible to set the corresponding second content stream for different content posters. For a content poster, the content they generally post is their own original content. If the frequency of posting contents is high, such as posting an average of 2 per day, the duration of the predetermined historical period may be set shorter, such as 5 days; if the frequency of posting contents is low, such as posting an average of 1 per week, the duration of the predetermined historical period may be set longer, such as 1 month, or the like.

In some embodiments, the length of the predetermined historical period may further be related to the number of contents (that is, the number of unread) that the current user has not performed a viewing operation, for example, may be negatively correlated. For example, for the content posted by the first user, if the current user has a large number of unread, the duration of the predetermined historical period may be set to be shorter; if the current user has a small number of unread, the duration of the predetermined historical period may be set to be longer.

In some embodiments, when determining the duration of the predetermined historical period, the frequency of contents posted by the first user and the number of contents that the current user has not performed a viewing operation may be considered together, thereby the duration of the predetermined historical period can be determined more reasonably and accurately.

In some embodiments, the first predetermined content switching condition is satisfied comprises: detecting a completion of playback of the first content. The advantage of this setting is that after the first content has been played, at least one of the second content and the information associated with the second content are automatically displayed, reducing user operations, and improving switching efficiency. For example, the completion of playback of the first content may include a completion of the first playback of the first content, such as an audio or a video has been played from the start to the end. Alternatively, if the second content satisfying the requirement is detected, at least one of the second content and the information associated with the second content may be displayed; if the second content that fails to satisfy the requirement is detected, the first content may be played in a loop, or a next content in the first content stream may be played automatically. The satisfaction of the requirement may be, for example, there is a content posted by the first user that has not been displayed to the current user, or there is a content posted by the first user in the most recent predetermined historical period that has not been displayed to the current user.

In some embodiments, satisfying the first predetermined content switching condition comprises: receiving a first predetermined switching operation. The first predetermined switching operation is different from the second predetermined switching operation, and the second predetermined switching operation is used to switch the content in the first content stream. The advantage of this setting is that it may support the current user to independently select the switching timing, thereby at least one of the second content or the information associated with the second content is displayed more flexibly. The second predetermined switching operation is used to switch the content in the first content stream, which may be an operation such as a first gesture operation or triggering a first control. In order to support content switching in the same content stream and content switching between different content streams together, and to avoid conflicts between the two content switching manners, the first predetermined switching operation different from the second predetermined switching operation may be set, for example, an operation such as a second gesture operation or triggering a second control.

In some embodiments, satisfying the first predetermined content switching condition comprises: a number of contents posted by the first user and having the predetermined association with the current user is greater than or equal to a first predetermined number threshold. The advantage of this setting is that if the number of content in the second content stream available for the current user to view reaches a certain value, at least one of the second content or the information associated with the second content is automatically triggered to display, causing the current user to timely understand the content or related information that is available to view without waiting for the completion of playback of the first content or actively entering the first predetermined switching operation, thereby enhancing convenience and enriching interactive forms.

In some embodiments, the first predetermined switching operation and the second predetermined switching operation are sliding operations, and the first predetermined switching operation is different from the second predetermined switching operation in at least one of: a sliding direction, a sliding starting point, a sliding end point, a sliding distance, or a sliding angle. The advantage of this setting is that the input manner of the sliding operation is more convenient for the user to operate, and the user does not need to deliberately look up the position of a relevant control, which may improve input efficiency. In addition, in some applications, many users have developed a habit of sliding to switch, for example, in the video application, the next video may be switched by a sliding up operation, that is, most of the second predetermined switching operations are sliding operations. Setting the first predetermined switching operation as the sliding operation may reduce the learning cost of users so that the users may adapt to the switching function between different content streams more quickly.

For example, the first predetermined switching operation and the second predetermined switching operation are both sliding operations, but in order to achieve different switching functions, operation manners of the sliding operations may be different. For example, if the sliding directions are different, the first predetermined switching operation may be sliding to the left, and the second predetermined switching operation may be sliding up; if the sliding starting points are different, the first predetermined switching operation may be sliding from the left boundary of the interface, and the second predetermined switching operation may be sliding from a predetermined area in the center of the interface; if the sliding distances are different, the first predetermined switching operation may be sliding up more than a first distance threshold, and the second predetermined switching operation may be sliding up less than a second distance threshold. The second distance threshold is lower than or equal to the first distance threshold. If the sliding angles are different, the first predetermined switching operation may be sliding to the upper left, and the second predetermined switching operation may be sliding to the bottom right, or the like.

In some embodiments, after the displaying, in the content stream display interface, at least one of a second content in a second content stream and information associated with the second content, the method further comprises: if a second predetermined content switching condition is satisfied, displaying a third content in the content stream display interface, where the third content is contained in the second content stream. The advantage of this setting is that the user may continue to view the content in the second content stream, that is, achieving content switching in the second content stream.

In this embodiment, the third content may be a content in the second content. For example, a second content in the second content stream is displayed in the content stream display interface, and the second content may not be displayed in full screen. If the second predetermined content switching condition is satisfied, the second content (equivalent to the third content) may be displayed in full screen in the content stream display interface; in another example, two second contents in the second content stream are displayed in the content stream display interface, and if the second predetermined content switching condition is that the user selects one of the second contents, the selected second content (equivalent to the third content) may be displayed in full screen in the content stream display interface; in the other example, information associated with the second content is displayed in the content stream display interface, and if the second predetermined content switching condition is that the user selects one of the information, the second content (equivalent to the third content) corresponding to the selected information may be displayed in the content stream display interface.

In this embodiment, the third content may be a content other than the second content. For example, the second content in the second content stream is displayed in the content stream display interface. If the second predetermined content switching condition is satisfied, a next content (corresponding to the third content) of the second content in the second content stream may be displayed in the content stream display interface.

In some embodiments, if the second predetermined content switching condition is satisfied, displaying the third content in the content stream display interface comprises: if a completion of playback of the second content is detected, displaying the third content in the content stream display interface. The advantage of this setting is that after the completion of playback of the second content, the next content in the second content stream is automatically displayed, which is convenient for users to view more contents in the second content stream, thereby reducing user operations, and further improving content distribution efficiency.

In some embodiments, if the second predetermined content switching condition is satisfied, displaying the third content in the content stream display interface may further comprise: if a third predetermined switching operation is received, displaying the third content in the content stream display interface. The advantage of this setting is that switching timing may be selected autonomously, thereby the content in the second content stream may be displayed more flexibly. The third predetermined switching operation may be the same as or different from the second predetermined switching operation; the third predetermined switching operation may be the same as or different from the first predetermined switching operation.

In some embodiments, after the displaying, in the content stream display interface, at least one of a second content in a second content stream and information associated with the second content, the method further comprises: if a second predetermined switching operation is received, displaying a fourth content in the content stream display interface, where the second predetermined switching operation is different from the first determined switching operation, the second predetermined switching operation is used to switch a content in the first content stream, and the fourth content is contained in the first content stream. The advantage of this setting is that it may support users to switch back to the content in the first content stream from displaying the second content or associated information in the second content stream, conveniently switching between different content streams, reducing user operations, and improving information delivery efficiency and content viewing efficiency.

In some embodiments, the information associated with the second content comprises prompt information for the content in the second content stream, and the prompt information is used to indicate a total number of the content in the second content stream. The advantage of this setting is that it is convenient for the user to know the total number of the content in the second content stream more intuitively, and then to decide to view the unviewed content in the second content stream, or to switch to view the content in the first content stream. A style or a display form of the prompt information may be text prompt information, such as a specific numerical value prompting the total number; it may further reflect the total number in a form of symbols, for example, the number of symbols is consistent with the total number.

In some embodiments, displaying the prompt information for the content in the second content stream in the content stream display interface comprises: if a number of contents posted by the first user and having the predetermined association with the current user is greater than or equal to a second predetermined number threshold, displaying the prompt information for the content in the second content stream in the content stream display interface; wherein the total number is a total number of contents posted by the first user and having the predetermined association with the current user. The advantage of this setting is that if the total number reaches the predetermined number threshold, the prompt information is displayed to avoid excessive occupation of the display area of the interface. If the total number is small, such as 2, which is less than the second predetermined number threshold (such as 5), the reference value to the current user may be small, the prompt information may not be displayed. The second predetermined number threshold may also be 1, so that if there is a content in the second content stream that is available to be displayed to the user, the prompt information is displayed to prompt the user of the existence of the second content stream; if the total number is less than 1, it indicates that there is no content in the second content stream that is available to be displayed to the user, and the user may continue to view the content in the first content stream.

Alternatively, the display manner of the prompt information may be determined based on the specific value of the total number. For example, if the total number is less than the first number threshold, a display manner such as a symbol or an image is used; if the total number is greater than the second number threshold, a display manner such as a text is used.

In some embodiments, the prompt information comprises at least one identifier corresponding to the content in the second content stream; a display state of the identifier changes dynamically based on a display state of an identified content. The advantage of this setting is that the user may determine the display state of the plurality of contents based on the display state of the identifier more intuitively.

For example, the display state of the identifier of the content that has been displayed is different from the display state of the identifier of the content that has not been displayed, or the display state of the identifier of the currently displayed content is different from the display state of an icon identifier of the content that has not been displayed.

In some embodiments, the method further comprises: if a trigger operation for the identifier is received, controlling a content corresponding to the identifier to play or pause. The advantage of this setting is that the content may be controlled by the identifier to play or pause, achieving richer and more flexible content playback control, enhancing content browsing experience of the user. The form of the trigger operation may be an operation such as a click, a long press, or the like. For example, if the content is in a playback state, the playback is paused by clicking on the corresponding identifier; if the content is in a pause state, the playback is continued by clicking on the corresponding identifier.

Figure 2:
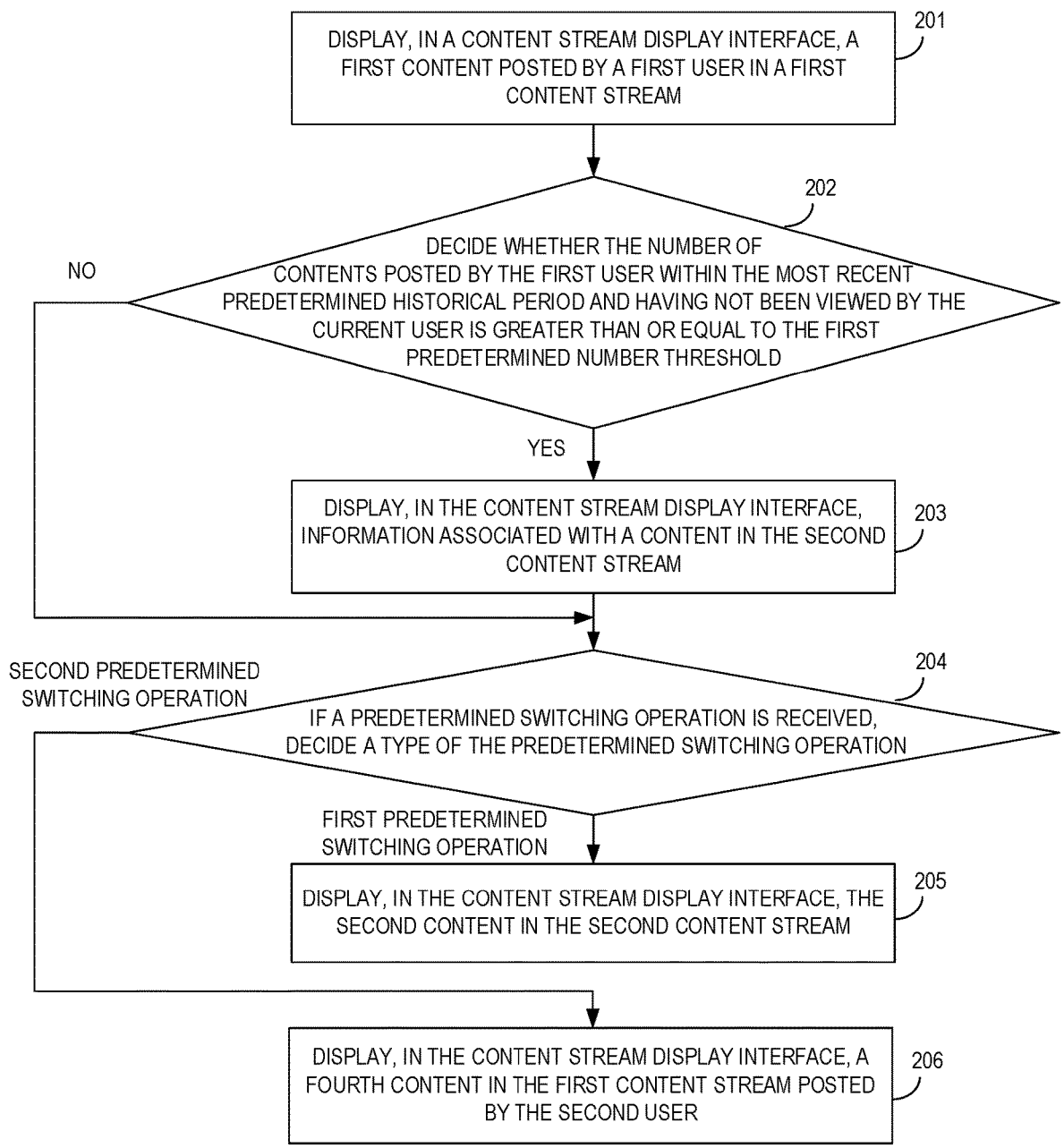
FIG. 2 is a schematic flow diagram of a further method of content display provided by the embodiments of the present disclosure.

FIG. 2 is a schematic flow diagram of a further method of content display provided by the embodiments of the present disclosure. The above embodiments of the present disclosure are modified based on a plurality of alternative schemes in the above embodiment, and the method comprises the following steps:

Step 201, displaying, in the content stream display interface, the first content posted by the first user in the first content stream.

In one embodiment, the first content stream comprises a content posted by the second user, and the second user is different from the first user.

For the sake of illustration, the video application is used as an example below. The content stream display interface may be a video recommendation page in the video application. The first video stream (the first content stream) contains videos posted by a plurality of users. It is assumed that determining that a video a (the first content) posted by a user A (the first user) is needed to be recommended to the current user based on a predetermined recommendation model, the video a is played in the video recommendation page.

Step 202: Decide whether the number of contents posted by the first user within the most recent predetermined historical period and having not been viewed by the current user is greater than or equal to the first predetermined number threshold. Perform step 203 based on the decided result that the number of contents posted by the first user within the most recent predetermined historical period and having not been viewed by the current user being greater than or equal to the first predetermined number threshold; perform step 204 based on the decided result that the number of contents posted by the first user within the most recent predetermined historical period and having not been viewed by the current user being less than the first predetermined number threshold.

In this embodiment, the duration of the predetermined historical period is negatively correlated with the frequency of contents posted by the first user. For example, if the frequency of contents posted by the user A is high, such as an average of 2 posted per day, the duration of the predetermined historical period may be shorter, such as 7 days; if the frequency of contents posted by the user A is low, such as an average of 1 is posted every 3 days, the duration of the predetermined historical period may be longer, such as 30 days. Assuming that the duration of the predetermined historical period is 30 days, the user A has posted a total of 9 videos in the last 30 days, and 6 of these 9 videos have not been watched by the current user, then the number of contents posted by the first user that have not been viewed by the current user within the most recent predetermined historical period (referred to as the first number) is 6. The first number is compared with the first predetermined number threshold, and assuming that the first predetermined number threshold is 2, 6 is greater than 2, then the step 203 may be performed.

It should be noted that if the first predetermined number threshold is 1 and the first number is equal to 1, then continue to decide whether the first content currently being displayed is the content that has not been viewed by the first user within the most recent predetermined historical period. Based on the decided result that the first content currently being displayed is the content that has not been viewed by the first user in the most recent predetermined historical period, it may indicate that there are no more second contents available for the current user to view, the step 203 may not be performed, for example, the process is terminated. Based on the decided result that the first content currently being displayed is not the content that has not been viewed by the first user in the most recent predetermined historical period, the step 203 may be performed. For example, if the user A has only posted 1 video in the last 30 days, that is, the video a that is currently playing, then the step 203 may not be performed.

Step 203: display, in the content stream display interface, information associated with a content in the second content stream.

In the present embodiment, the content of the second content stream is a content posted by the first user within the most recent predetermined historical period that has not been viewed by the current user. For example, the information associated with the second content may comprise prompt information for the content in the second content stream, and the prompt information is used to indicate a total number of the content in the second content stream. The display manner for the prompt information may include a form such as a text, an identifier, or the like.

Figure 3:
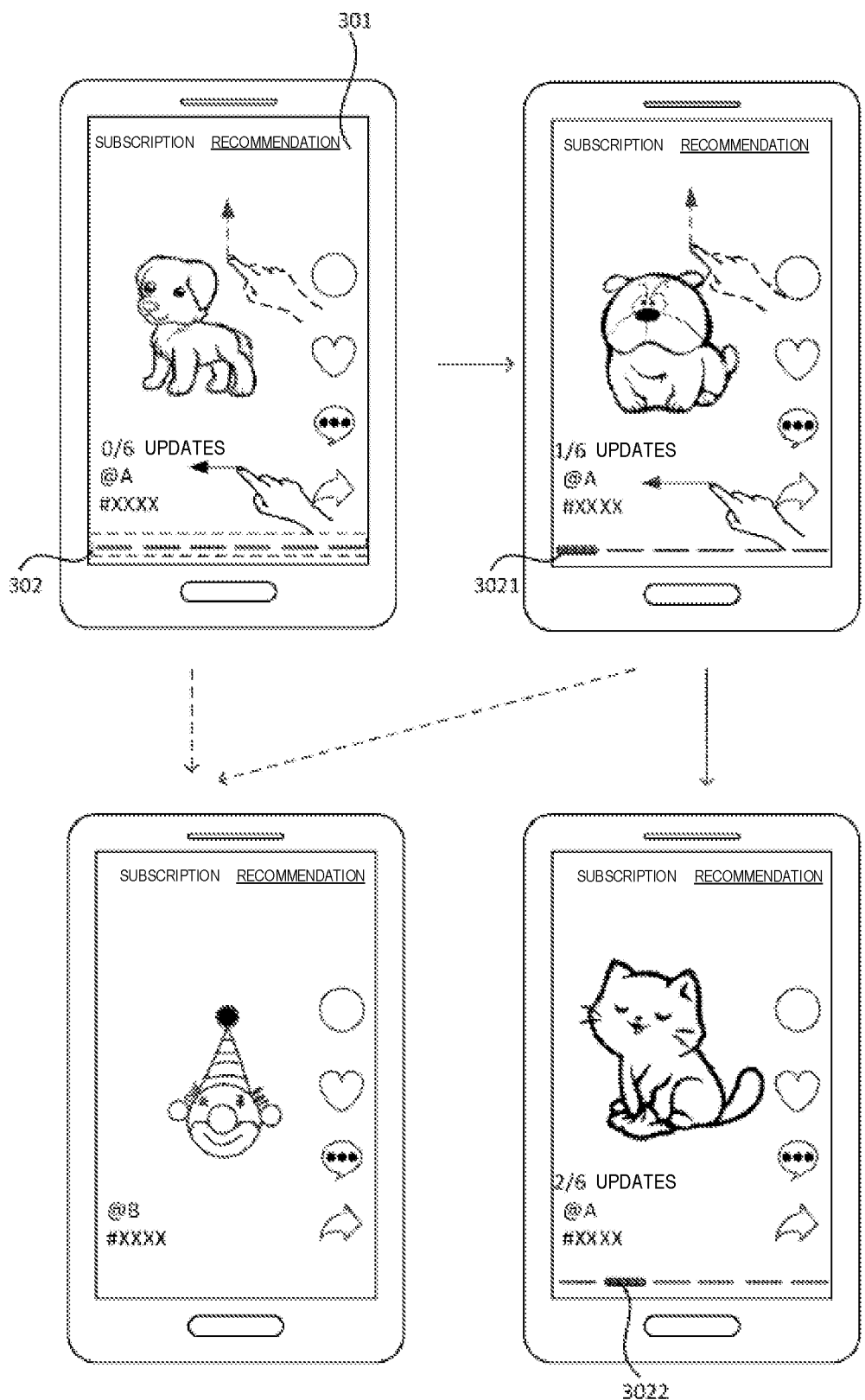
FIG. 3 is a schematic diagram of an interaction process provided by the embodiments of the present disclosure.

FIG. 3 is a schematic diagram of an interaction process provided by the embodiments of the present disclosure. As shown in FIG. 3, a video a about a puppy posted by the user A is playing in a video recommendation page 301. The first number is 6, that is, the total number of videos in the second video stream (the second content stream) is 6. The prompt information in a form of a text "6 updates" may be displayed. In addition, the prompt information in a form of an identifier may further be displayed, such as six identifiers 302 displayed in a form of a short line in the figure, and each identifier corresponds to a video in the second video stream. In addition, assuming that the video a is not one of the six videos, the text prompt information may also be displayed as "0/6 updates" to prompt the user.

Step 204, if a predetermined switching operation is received, decide a type of the predetermined switching operation. Perform step 205 based on the decided result that the type of the predetermined switching operation is the first predetermined switching operation. Perform step 206 based on the decided result that the type of the predetermined switching operation is the second predetermined switching operation.

For example, the predetermined switching operation may be a sliding operation. If the sliding operation input by the current user is received, the type of sliding operation may be decided. It is assumed that the first predetermined switching operation is a left sliding operation, and the second predetermined switching operation is an upward sliding operation.

Alternatively, if the user does not input the predetermined switching operation before the completion of playback of the first content, then the second content in the second content stream may be displayed in the content stream display interface after detecting the completion of playback of the first content. For example, if the user does not input the first predetermined switching operation or the second predetermined switching operation during the process of watching the video a, then another video b about a puppy in the second video stream may be switched to play automatically after the video a completes a first playback.

Step 205: display, in the content stream display interface, the second content in the second content stream.

For example, if the user currently inputs the first predetermined switching operation, the second content in the second content stream may be switched to be displayed. As shown in FIG. 3, if the user inputs the left swiping operation, the video b in the second video stream may be switched to be played.

Alternatively, the display state of the identifier changes dynamically according to the display state of the identified content. As shown in FIG. 3, if none of the six videos in the second content stream have been viewed by the current user, all the six identifiers 302 are displayed as thin and short lines. If the video b is played, a first identifier 3021 used to identify the video b changes from the display state of the thin and short lines to the display state of thick and short lines, indicating that the video b is currently in a playing state. In addition, the text prompt information is further changed to "1/6 updates", indicating that the first video out of the six videos is currently playing.

Step 206: display, in the content stream display interface, the fourth content in the first content stream posted by the second user.

For example, if the user currently inputs the second predetermined switching operation, the fourth content in the first content stream may be switched to be displayed. The fourth content may be the next content of the first content in the first content stream. As shown in FIG. 3, if the user inputs the upward sliding operation, the video d about a clown posted by a user B (the second user) in the first video stream may be switched to be played.

The method of content display provided by the embodiments of the present disclosure may be applied to video applications. If the first video posted by the first user in the first video stream is displayed in the video recommendation interface, and if the number of videos posted by the first user within the recent predetermined historical period that have not been watched by the current user is greater than or equal to the first predetermined number threshold, information associated with the video in the second video stream may be displayed to prompt the current user. After the user sees this information, they may switch to view videos in different video streams by inputting different predetermined switching operations, so that a video consumption flow line changes from one dimension to two dimensions, enriching the interaction pattern, which is conducive to improving the efficiency of video distribution and video browsing.

Based on the above embodiments, after displaying, in the content stream display interface, the second content in the second content stream, the user may also be supported to continue to view other contents in the second content stream, or to switch back to view other contents in the first content stream. For example, if the predetermined switching operation is received, the type of the predetermined switching operation is decided. Based on the decided result that the type of the predetermined switching operation is the third predetermined switching operation (which may be the same or different from the first predetermined switching operation), the third content in the second content stream is displayed in the content stream display interface. Based on the decided result that the type of the predetermined switching operation is the second predetermined switching operation, a fifth content in the first content stream is displayed in the content stream display interface (which may be the same or different from the fourth content).

As shown in FIG. 3, during the process of playing the video b, if the user enters the left swiping operation again (or clicks on a second short line identifier), the next video c about a kitten in the second video stream may be switched to be displayed. At this time, a second identifier 3022 used to identify the video c changes from the display state of the thin short line to the display state of the thick short line, indicating that the current video c is in the playing state. In addition, the text prompt message is further changed to "2/6 updates", indicating that the second video out of 6 videos is currently playing. Alternatively, if the user does not enter the predetermined switching operation before the first playback of the video b is completed, then after the completion of playback of the video b is detected, the video c may be switched to play automatically.

As shown in FIG. 3, during the process of playing the video b, if the user inputs the upward sliding operation, the video d about the clown posted by the user B (the second user) in the first video stream may be switched to play. It should be noted that before the user switches to the second video stream, the video d is the next video of the video a in the first video stream. However, after the user has switched to watch the video in the second video stream, the watched video changes, which may affect the input and/or output of the predetermined recommendation model. In this case, during the process of playing the video b, if the user inputs the upward sliding operation, the video e posted by user C may further be played.

Figure 4:
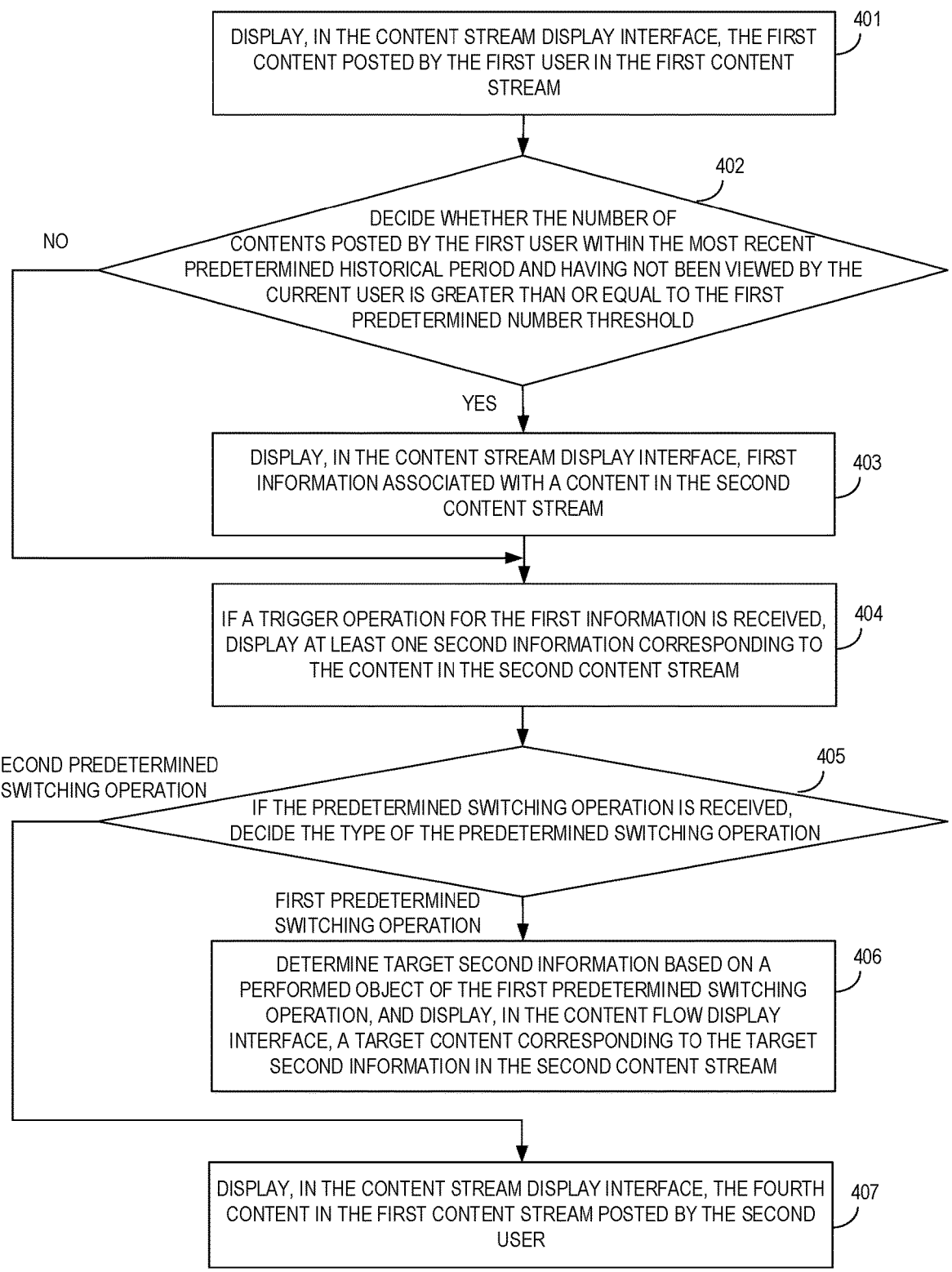
FIG. 4 is a schematic flow diagram of a further method of content display provided by the embodiments of the present disclosure.

FIG. 4 is a schematic flow diagram of a further method of content display provided by the embodiments of the present disclosure, and the embodiments of the present disclosure are modified based on multiple alternative schemes in the above embodiments. The method includes the following steps.

Step 401: display, in the content stream display interface, the first content posted by the first user in the first content stream.

Step 402: decide whether the number of contents posted by the first user within the most recent predetermined historical period and having not been viewed by the current user is greater than or equal to the first predetermined number threshold. Perform step 403 based on the decided result that the number of contents posted by the first user within the most recent predetermined historical period and having not been viewed by the current user being greater than or equal to the first predetermined number threshold; perform step 404 based on the decided result that the number of contents posted by the first user within the most recent predetermined historical period and having not been viewed by the current user being less than the first predetermined number threshold.

Step 403: display, in the content stream display interface, first information associated with a content in the second content stream.

For ease of explanation, the video application is still used as an example. The first information includes the prompt information for the content in the second content stream, and the prompt information is used to indicate the total number of contents in the second content stream.

Figure 5:
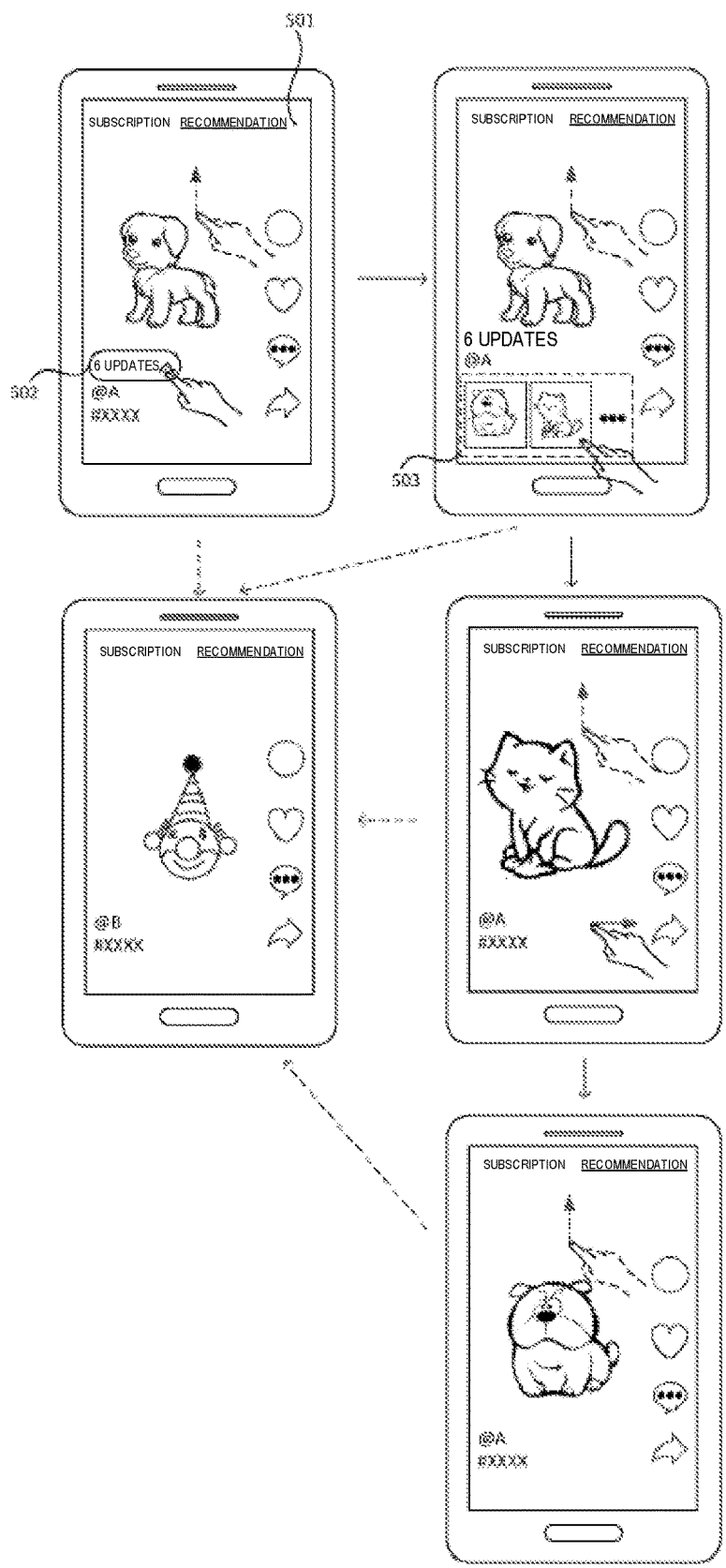
FIG. 5 is a schematic diagram of a further interaction process provided by the embodiments of the present disclosure.

FIG. 5 is a schematic diagram of a further interaction process provided by the embodiments of the present of the disclosure. As shown in FIG. 5, a video about the puppy posted by the user A is playing in a video recommendation page 501, and the first number is 6, that is, the total number of videos in the second video stream is 6. First information 502 may be displayed in the video recommendation page 501, and as shown in FIG. 5, the first information 502 may be displayed in an interactive control which may further include an expansion identifier (such as the arrow in the figure).

Step 404: if a trigger operation for the first information is received, display at least one second information corresponding to the content in the second content stream.

For example, the second information may be a thumbnail of a content. As shown in FIG. 5, if the user clicks on the interactive control where the first information 502 is located, the first information 502 may be triggered. Subsequently, two video screenshots 503 corresponding to the videos in the second video stream are expanded to display. The two video screenshots 503 are the second information, which are a screenshot of another video b about a puppy and a screenshot of the video c about a kitten, respectively. The screenshot of the video may further be a cover of the video, which may be any frame of video images in the video, a processed image (such as cropping, zooming, or the like) of any frame of the video images, or an image related to the video content designed by the video author for the video (which may be different from any frame of the video images). By viewing the second information, the current user may quickly understand the general content of a plurality of videos and may switch contents selectively. Alternatively, a display switching operation for the second information may further be supported. For example, the user may input a sliding operation in the area where the video screenshots 503 are located to display video screenshots corresponding to more videos.

Alternatively, if the current user has viewed the first information or ignored the first information, the video d about the clown posted by the user B (the second user) in the first video stream may be switched to play by inputting the second predetermined switching operation.

Step 405: if the predetermined switching operation is received, decide a type of the predetermined switching operation. Perform step 406 based on the decided result that the type of the predetermined switching operation is the first predetermined switching operation. Perform step 407 based on the decided result that the type of the predetermined switching operation is the second predetermined switching operation.

For example, the predetermined switching operation may be different gesture operations. If a gesture operation input by the current user is received, the type of the gesture operation may be decided. It is assumed that the first predetermined switching operation is a clicking operation and the second predetermined switching operation is the upward sliding operation.

Step 406: determine target second information based on a performed object of the first predetermined switching operation, and display, in the content flow display interface, a target content corresponding to the target second information in the second content stream.

For example, if the first predetermined switching operation is currently input by the user, as in the above example, the first predetermined switching operation may be the clicking operation, so that the user may selectively input the clicking operation for the target content they want to view, and then the target content in the second content stream may be directly switched to display. As shown in FIG. 5, if the user inputs the clicking operation for the video screenshot of the video c about a kitten, the video c may be determined as the target video, and then the video c in the second video stream may be switched to play in the video recommendation page.

Alternatively, after displaying, in the content stream display interface, the target content corresponding to the target second information in the second content stream, the content in the second content stream may continue to be switched to display based on the received third predetermined switching operation. As shown in FIG. 5, during the process of playing the video c in the video recommendation page, the user may input a right swiping operation to switch to play the video b.

Alternatively, if the target content or other contents corresponding to the target second information in the second content stream is displayed in the content stream display interface, the second information corresponding to the content in the second content stream may continue to be displayed, making it convenient for the user to select a suitable content for viewing. For example, during the process of playing the video b and the video c, a video screenshot of a video in the second video stream may further be displayed in the video recommendation page.

Step 407, display, in the content stream display interface, the fourth content in the first content stream posted by the second user.

For example, if the user currently inputs the second predetermined switching operation, the fourth content in the first content stream may be switched to be displayed. The fourth content may generally be the next content of the first content in the first content stream. As shown in FIG. 5, if the user inputs the upward sliding operation, the video d in the first video stream may be switched to be played.

Alternatively, during the process of watching videos in the second video stream, the user may switch back to the first video stream to continue watching more videos posted by the video author in the first video stream by inputting the second predetermined switching operation. As shown in FIG. 5, during the playback of the videos a, the video b, and the video c, the user may switch to play the video d by inputting the upward sliding operation.

The method of content display provided by the embodiments of the present disclosure may be applied to video applications. If the first video posted by the first user in the first video stream is displayed in the video recommendation interface, and if the number of videos posted by the first user within the recent predetermined historical period that have not been watched by the current user is greater than or equal to the first predetermined number threshold, the first information associated with the video in the second video stream may be displayed to prompt the current user the number of videos newly posted by the first user that are available to watch. After the user sees the first information, the user may choose whether to expand to display the second information. The second information is a screenshot of the video in the second video stream. The user may gain an understanding of a video content summary through the screenshot, and switch to watching the selected video in the second video stream by triggering the second information. During the process of watching the video in the second video stream, the first video stream may be returned to for video consumption by an operation such as the upward sliding, so that the video consumption flow line changes from one dimension to two dimensions, and the interaction manner becomes more flexible and convenient, which is conducive to improving the efficiency of video distribution and video browsing.

Figure 6:
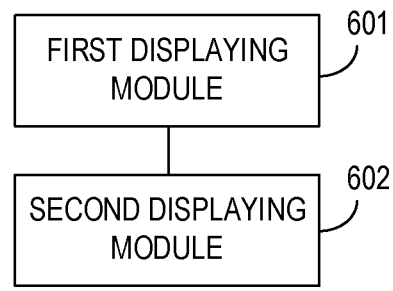
FIG. 6 is a structural block diagram of an apparatus for content display provided by the embodiments of the present disclosure.

FIG. 6 is a block diagram of an apparatus for content display provided by the present disclosure, which may be implemented by software and/or hardware, may generally be integrated into an electronic device, and may be displayed by performing the method of content display. As shown in FIG. 6, the apparatus comprises:

a first displaying module 601 configured to display, in a content stream display interface, a first content in a first content stream, wherein the first content is posted by a first user; and a second displaying module 602 configured to, if a first predetermined content switching condition is satisfied, display, in the content stream display interface, at least one of a second content in a second content stream and information associated with the second content, wherein the second content has a predetermined association with an operation of a current user, and the content in the second content stream is posted by the first user.

In the apparatus for content display provided by the embodiments of the present disclosure, the first content in the first content stream is displayed in the content stream display interface. If the first predetermined content switching condition is satisfied, at least one of the second content in the second content stream and information associated with the second content is displayed in the content stream display interface, where the second content has the predetermined association with the operation of the current user, and the content in the second content stream is posted by the first user. By adopting the above technical solution, the content or the associated information in different content streams may be displayed more flexibly, the content display manner may be enriched, and the switching between different content streams may be performed more conveniently, reducing user operations, which is conducive to improving information delivery efficiency and content viewing efficiency.

Alternatively, the first content is posted by the first user, and the first content stream comprises the content posted by the second user. The second user is different from the first user.

Alternatively, the second content has a predetermined association with an operation of a current user comprises: the second content is a content that the current user has not performed a viewing operation.

Alternatively, the second content stream comprises a content posted by the first user in a most recent predetermined historical period; or the second content stream comprises a predetermined number of contents recently posted by the first user.

Alternatively, a duration of the predetermined historical period is negatively correlated with a frequency of contents posted by the first user.

Alternatively, a first predetermined content switching condition is satisfied comprises at least one of:
detecting a completion of playback of the first content;
receiving a first predetermined switching operation, wherein the first predetermined switching operation is different from a second switching operation for switching a content in the first content stream; and
a number of contents posted by the first user and having the predetermined association with the current user is greater than or equal to a first predetermined number threshold.

Alternatively, the apparatus may further comprise a third displaying module configured to, after the displaying, in the content stream display interface, at least one of a second content in a second content stream and information associated with the second content, if a second predetermined content switching condition is satisfied, display a third content in the content stream display interface. The third content is contained in the second content stream.

Alternatively, the if a second predetermined content switching condition is satisfied, displaying a third content in the content stream display interface comprises at least one of: if a completion of playback of the second content is detected, displaying the third content in the content stream display interface; or if a third predetermined switching operation is received, displaying the third content in the content stream display interface.

Alternatively, the apparatus may further comprise a fourth displaying module configured to, after the displaying, in the content stream display interface, at least one of a second content in a second content stream and information associated with the second content, if a second predetermined switching operation is received, display the fourth content in the content stream display interface. The second predetermined switching operation is different from the first predetermined switching operation. The second predetermined switching operation is used to switch a content in the first content stream, and the fourth content is contained in the first content stream.

Alternatively, the first predetermined switching operation and the second predetermined switching operation are sliding operations, and the first predetermined switching operation is different from the second predetermined switching operation in at least one of: a sliding direction, a sliding starting point, a sliding end point, a sliding distance, or a sliding angle.

Alternatively, the information associated with the second content comprises prompt information for the content in the second content stream, and the prompt information is used to indicate a total number of the content in the second content stream.

Alternatively, displaying the prompt information for the content in the second content stream in the content stream display interface comprises: if a number of contents posted by the first user and having the predetermined association with the current user is greater than or equal to a second predetermined number threshold, displaying the prompt information for the content in the second content stream in the content stream display interface; the total number is a total number of contents posted by the first user and having the predetermined association with the current user.

Alternatively, the prompt information comprises at least one identifier corresponding to the content in the second content stream; and a display state of the identifier changes dynamically based on a display state of an identified content.

Alternatively, the apparatus further comprises:
a playback control module configured to, if a trigger operation for the identifier is received, control a content corresponding to the identifier to play or pause.

Figure 7:
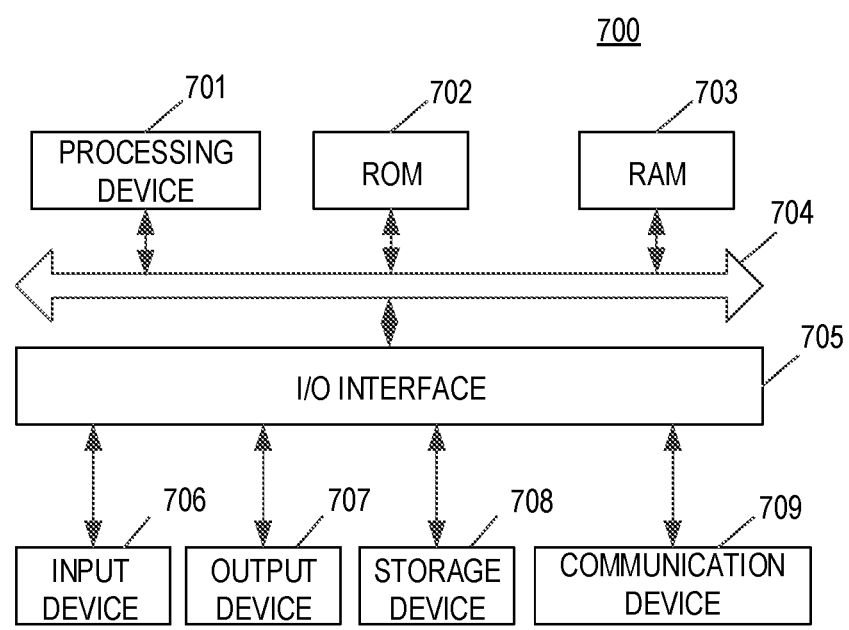
FIG. 7 is a structural block diagram of an electronic device provided by the embodiments of the present disclosure.

A reference is now made to FIG. 7, which is a schematic diagram of the structure of an electronic device 700 suitable for implementing the embodiments of the present disclosure. The electronic device in the present disclosure may include but is not limited to a mobile terminal such as a mobile phone, a laptop, a digital broadcast receiver, a personal digital assistant (PDA), a Portable Android Device (PAD), a Portable Media Player (PMP), a vehicle-mounted terminal (such as a vehicle navigation terminal), and a fixed terminal such as a digital television (TV), a desktop computer, etc. The electronic device shown in FIG. 7 is only an example.

As shown in FIG. 7, the electronic device 700 may include a processing device (such as a central processing unit and a graphics processor) 701, which may execute various appropriate actions and processing according to a program stored in a read-only memory (ROM) 702 or a program loaded to a random access memory (RAM) 703 from a storage device 708. Various programs and data required during operation of the electronic device 300 are also stored in the RAM 703. The processing device 701, the ROM 702 and the RAM 703 are connected with one another via a bus 704. An input/output (I/O) interface 705 is also connected to the bus 704.

Generally, the following apparatuses may be connected to the I/O interface 705: an input device 706 including for example a touch screen, a touch pad, a keyboard, a mouse, a camera, a microphone, an accelerometer and a gyroscope; an output device 707 including for example a liquid crystal display (LCD), a speaker and a vibrator; a storage device 708 including for example a magnetic tape and a hard disk; and a communication device 709. The communication device 709 may allow wireless or wired communication between the electronic device 700 and other devices for data exchange. Although FIG. 7 shows the electronic device 700 having various devices, it should be understood that not all the devices shown are necessarily required to be implemented or provided. More or fewer devices may alternatively be implemented or provided.

Specifically, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 709, or installed from the storage device 708, or installed from the ROM 702. The computer program, when executed by the processing unit 701, causes the processing unit to execute the above functions defined in the methods according to the embodiments of the present disclosure.

The computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

The computer-readable medium may be included in the electronic device described above; or it may exist alone without being assembled into the electronic device.

The computer-readable medium carries one or more programs, and when the one or more programs are executed by the electronic device, causes the electronic device: display, in a content stream display interface, a first content in a first content stream; the first content is posted by a first user; the first content stream comprises the content posted by the second user, and the second user is different from the first user; and if a first predetermined content switching condition is satisfied, displaying, in the content stream display interface, at least one of a second content in a second content stream and information associated with the second content, wherein the second content has a predetermined association with an operation of a current user, and the content in the second content stream is posted by the first user.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations or can be implemented by the combination of dedicated hardware and computer instructions.

The modules described in the embodiments of the present disclosure may be implemented by software or hardware. The name of the module does not constitute a limitation on the module itself in some case. For example, the first displaying module may be further described as "displaying, in a content stream display interface, a first content in a first content stream, wherein the first content is posted by a first user, the first content stream comprises the content posted by a second user, and the second user is different from the first user".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, the present disclosure discloses a method of content display, and the method comprises:
  displaying, in a content stream display interface, a first content in a first content stream; and
  if a first predetermined content switching condition is satisfied, displaying, in the content stream display interface, at least one of a second content in a second content stream and information associated with the second content, wherein the second content has a predetermined association with an operation of a current user, and the content in the second content stream is posted by the first user.

Alternatively, the second content has a predetermined association with an operation of a current user comprises:
  the second content is a content that the current user has not performed a viewing operation.

Alternatively, the second content stream comprises a content posted by the first user in a most recent predetermined historical period; or the second content stream comprises a predetermined number of contents recently posted by the first user.

Alternatively, a duration of the predetermined historical period is negatively correlated with a frequency of contents posted by the first user.

Alternatively, a first predetermined content switching condition is satisfied comprises at least one of:
  detecting a completion of playback of the first content;
  receiving a first predetermined switching operation, wherein the first predetermined switching operation is different from a second switching operation for switching a content in the first content stream; and
  a number of contents posted by the first user and having the predetermined association with the current user is greater than or equal to a first predetermined number threshold.

Alternatively, after the displaying, in the content stream display interface, at least one of a second content in a second content stream and information associated with the second content, the method further comprises:
  if a second predetermined content switching condition is satisfied, displaying a third content in the content stream display interface, wherein the third content is contained in the second content stream.

Alternatively, the if a second predetermined content switching condition is satisfied, displaying a third content in the content stream display interface comprises at least one of: if a completion of playback of the second content is detected, displaying the third content in the content stream display interface; or if a third predetermined switching operation is received, displaying the third content in the content stream display interface.

Alternatively, after the displaying, in the content stream display interface, at least one of a second content in a second content stream and information associated with the second content, the method further comprises:
  if a second predetermined switching operation is received, displaying a fourth content in the content stream display interface, wherein the second predetermined switching operation is used to switch a content in the first content stream, and the fourth content is contained in the first content stream.

Alternatively, the first predetermined switching operation and the second predetermined switching operation are sliding operations, and the first predetermined switching operation is different from the second predetermined switching operation in at least one of: a sliding direction, a sliding starting point, a sliding end point, a sliding distance, or a sliding angle.

Alternatively, the information associated with the second content comprises prompt information for the content in the second content stream, and the prompt information is used to indicate a total number of the content in the second content stream.

Alternatively, displaying the prompt information for the content in the second content stream in the content stream display interface comprises:
  if a number of contents posted by the first user and having the predetermined association with the current user is greater than or equal to a second predetermined number threshold, displaying the prompt information for the content in the second content stream in the content stream display interface;
  wherein the total number is a total number of contents posted by the first user and having the predetermined association with the current user.

Alternatively, the prompt information comprises at least one identifier corresponding to the content in the second content stream; and
  a display state of the identifier changes dynamically based on a display state of an identified content.

Alternatively, the method further comprises:
  if a trigger operation for the identifier is received, controlling a content corresponding to the identifier to play or pause.

Alternatively, the first content is posted by the first user. The first content stream comprises a content posted by a second user, and the second user is different from the first user.

According to one or more embodiments of the present disclosure, an apparatus for content display is provided, and the apparatus comprises:
  a first displaying module configured to display, in a content stream display interface, a first content in a first content stream, wherein the first content is posted by a first user; and
  a second displaying module configured to, if a first predetermined content switching condition is satisfied, display, in the content stream display interface, at least one of a second content in a second content stream and information associated with the second content, wherein the second content has a predetermined association with an operation of a current user, and the content in the second content stream is posted by the first user.

I claim:

1. A method of content display, comprising:
  displaying, in a content stream display interface, a first content in a first content stream, wherein the first content is posted by a first user; and
  in response to determining that a first predetermined content switching condition is satisfied, displaying, in the content stream display interface, at least one of a second content in a second content stream and information associated with the second content, wherein the second content has a predetermined association with an operation of a current user, and content in the second content stream is posted by the first user,
  wherein the information associated with the second content comprises prompt information for the content in the second content stream, and the prompt information is configured to indicate a total number of the content in the second content stream.

2. The method of claim 1, wherein the second content has a predetermined association with an operation of a current user comprises:
  the second content is at least one of: a content that the current user has not performed a viewing operation, a content that the current user has performed a collecting operation, or a content that the current user has performed a reserving operation.

3. The method of claim 2, wherein the second content stream comprises a content posted by the first user in a most recent predetermined historical period; or the second content stream comprises a predetermined number of contents recently posted by the first user.

4. The method of claim 3, wherein a duration of the predetermined historical period is negatively correlated with a frequency of contents posted by the first user.

5. The method of claim 1, wherein a first predetermined content switching condition is satisfied comprises at least one of:
  detecting a completion of playback of the first content;
  receiving a first predetermined switching operation, wherein the first predetermined switching operation is different from a second switching operation for switching a content in the first content stream; and
  a number of contents posted by the first user and having the predetermined association with the current user is greater than or equal to a first predetermined number threshold.

6. The method of claim 5, wherein the first predetermined switching operation and the second predetermined switching operation are sliding operations, and the first predetermined switching operation is different from the second predetermined switching operation in at least one of: a sliding direction, a sliding starting point, a sliding end point, a sliding distance, or a sliding angle.

7. The method of claim 1, after the displaying, in the content stream display interface, at least one of a second content in a second content stream and information associated with the second content, the method further comprising:
  in response to determining that a second predetermined content switching condition is satisfied, displaying a third content in the content stream display interface, wherein the third content is contained in the second content stream.

8. The method of claim 7, wherein the displaying a third content in the content stream display interface comprises at least one of:
  in response to detecting that a completion of playback of the second content, displaying the third content in the content stream display interface; or
  in response to receiving a third predetermined switching operation, displaying the third content in the content stream display interface.

9. The method of claim 1, after the displaying, in the content stream display interface, at least one of a second content in a second content stream and information associated with the second content, the method further comprising:
  in response to receiving a second predetermined switching operation, displaying a fourth content in the content stream display interface, wherein the second predetermined switching operation is used to switch a content in the first content stream, and the fourth content is contained in the first content stream.

10. The method of claim 1, wherein displaying the prompt information for the content in the second content stream in the content stream display interface comprises:
  in response to determining that a number of contents posted by the first user and having the predetermined association with the current user is greater than or equal to a second predetermined number threshold, displaying the prompt information for the content in the second content stream in the content stream display interface;
  wherein the total number is a total number of contents posted by the first user and having the predetermined association with the current user.

11. The method of claim 1, wherein the prompt information comprises at least one identifier corresponding to the content in the second content stream; and
  a display state of the identifier changes dynamically based on a display state of an identified content.

12. The method of claim 1, further comprising:
  in response to receiving a trigger operation for the identifier, controlling a content corresponding to the identifier to play or pause.

13. The method of claim 1, wherein the first content stream comprises a content posted by a second user, and the second user is different from the first user.

14. An electronic device comprising a memory, a processor, and a computer program stored on the memory and executable on the processor, the processor, when executes the computer program, performs operations comprising:
  displaying, in a content stream display interface, a first content in a first content stream, wherein the first content is posted by a first user; and
  in response to determining that a first predetermined content switching condition is satisfied, displaying, in the content stream display interface, at least one of a second content in a second content stream and information associated with the second content, wherein the second content has a predetermined association with an operation of a current user, and content in the second content stream is posted by the first user,
  wherein the information associated with the second content comprises prompt information for the content in the second content stream, and the prompt information is configured to indicate a total number of the content in the second content stream.

15. The electronic device of claim 14, wherein the second content has a predetermined association with an operation of a current user comprises:
  the second content is at least one of: a content that the current user has not performed a viewing operation, a content that the current user has performed a collecting operation, or a content that the current user has performed a reserving operation.

16. The electronic device of claim 15, wherein the second content stream comprises a content posted by the first user in a most recent predetermined historical period; or the second content stream comprises a predetermined number of contents recently posted by the first user.

17. The electronic device of claim 16, wherein a duration of the predetermined historical period is negatively correlated with a frequency of contents posted by the first user.

18. The electronic device of claim 14, wherein a first predetermined content switching condition is satisfied comprises at least one of:
  detecting a completion of playback of the first content;
  receiving a first predetermined switching operation, wherein the first predetermined switching operation is different from a second switching operation for switching a content in the first content stream; and
  a number of contents posted by the first user and having the predetermined association with the current user is greater than or equal to a first predetermined number threshold.

19. A non-transitory computer-readable storage medium having a computer program stored thereon, the computer program, when executed by a processor, performs acts comprising:
  displaying, in a content stream display interface, a first content in a first content stream, wherein the first content is posted by a first user; and
  in response to determining that a first predetermined content switching condition is satisfied, displaying, in the content stream display interface, at least one of a second content in a second content stream and information associated with the second content, wherein the second content has a predetermined association with an operation of a current user, and content in the second content stream is posted by the first user, wherein the information associated with the second content comprises prompt information for the content in the second content stream, and the prompt information is configured to indicate a total number of the content in the second content stream.

20. The non-transitory computer-readable storage medium of claim 19, the acts further comprising:

displaying the prompt information for the content in the second content stream in the content stream display interface in response to determining that a number of contents posted by the first user and having the predetermined association with the current user is greater than or equal to a second predetermined number threshold, wherein the total number is a total number of the contents posted by the first user and having the predetermined association with the current user.

* * * * *